(12) United States Patent
Lin et al.

(10) Patent No.: US 8,924,634 B2
(45) Date of Patent: Dec. 30, 2014

(54) METHOD FOR PERFORMING HOST-DIRECTED OPERATIONS, AND ASSOCIATED MEMORY DEVICE AND CONTROLLER THEREOF

(75) Inventors: Ming-Yen Lin, Taipei (TW); Hsu-Ping Ou, Hsinchu County (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 310 days.

(21) Appl. No.: 13/425,444

(22) Filed: Mar. 21, 2012

(65) Prior Publication Data
US 2012/0278540 A1 Nov. 1, 2012

(30) Foreign Application Priority Data
Apr. 27, 2011 (TW) .............................. 100114615 A

(51) Int. Cl.
*G06F 12/00* (2006.01)
*G06F 9/30* (2006.01)
*G06F 12/02* (2006.01)

(52) U.S. Cl.
CPC ............ *G06F 12/00* (2013.01); *G06F 12/0246* (2013.01); *G06F 2212/7202* (2013.01)
USPC .......................................... 711/103; 712/227

(58) Field of Classification Search
None
See application file for complete search history.

(56) References Cited

U.S. PATENT DOCUMENTS

| | | | |
|---|---|---|---|
| 6,671,836 B1 * | 12/2003 | Lai et al. ........................ | 714/718 |
| 2009/0063913 A1 * | 3/2009 | Yamasaki et al. .............. | 714/718 |
| 2009/0063916 A1 * | 3/2009 | Vogelsang ..................... | 714/719 |

FOREIGN PATENT DOCUMENTS

| | | |
|---|---|---|
| TW | 201106366 | 2/2011 |
| TW | 201108237 | 3/2011 |

\* cited by examiner

*Primary Examiner* — Gary Portka
(74) *Attorney, Agent, or Firm* — Winston Hsu; Scott Margo

(57) ABSTRACT

A method for performing host-directed operations is provided, where the method is applied to a controller of a Flash memory that includes a plurality of blocks. The method includes: in a test mode of the controller, when receiving a host command from a host device, extracting at least one portion of associated information of the host command, where the at least one portion of the associated information is an encoded result that is generated by performing encoding on a host-directed operation command; and analyzing the at least one portion of the associated information according to at least one predetermined rule, in order to perform a host-directed operation corresponding to the host-directed operation command. An associated memory device and a controller thereof are also provided.

18 Claims, 7 Drawing Sheets

METHOD FOR PERFORMING HOST-DIRECTED OPERATIONS, AND ASSOCIATED MEMORY DEVICE AND CONTROLLER THEREOF

BACKGROUND OF THE INVENTION

1. Field of the Invention

The present invention relates to access to a Flash memory, and more particularly, to a method for performing host-directed operations, and to an associated memory device and a controller thereof.

2. Description of the Prior Art

As technologies of Flash memories progress in recent years, many kinds of portable memory devices (e.g. memory cards respectively complying with SD/MMC, CF, MS, and XD standards) or solid state drives (SSDs) equipped with Flash memories are widely implemented in various applications. Therefore, the control of access to Flash memories in these memory devices has become an important issue.

Taking NAND Flash memories as an example, they can mainly be divided into two types, i.e. Single Level Cell (SLC) Flash memories and Multiple Level Cell (MLC) Flash memories. Each transistor that is considered a memory cell in SLC Flash memories only has two charge levels that respectively represent a logical value 0 and a logical value 1. In addition, the storage capability of each transistor that is considered a memory cell in MLC Flash memories can be fully utilized. More specifically, the voltage for driving memory cells in the MLC Flash memories is typically higher than that in the SLC Flash memories, and different voltage levels can be applied to the memory cells in the MLC Flash memories in order to record information of at least two bits (e.g. binary values 00, 01, 11, or 10) in a transistor that is considered a memory cell. Theoretically, the storage density of the MLC Flash memories may reach twice the storage density of the SLC Flash memories, which is considered good news for NAND Flash memory manufacturers who encountered a bottleneck of NAND Flash technologies.

As MLC Flash memories are cheaper than SLC Flash memories, and are capable of providing higher capacity than SLC Flash memories while the space is limited, MLC Flash memories have been a main stream for implementation of most portable memory devices on the market. However, various problems of the MLC Flash memories have arisen due to their unstable characteristics. In order to ensure that the access control of a memory device over the Flash memory therein can comply with related standards, the controller of the Flash memory should have some handling mechanisms in order to properly handle its data access operations.

According to the related art, the memory device having the aforementioned handling mechanisms may still suffer from some deficiencies. In order to find out various kinds of possible issues under consideration, a Flash memory vendor typically designs one or more sets of special commands for being embedded in a program code within the memory device, in order to perform test operations on the Flash memory in the memory device when needed. In some situations, it may be improper for the Flash memory vendor to provide a memory controller vendor with the special commands due to some reasons. In addition, in some situations, the special commands may be very complicated and the overall amount of the special commands (i.e. the number of commands) may be very great, so it is typically required for the Flash memory vendor to communicate with the memory controller vendor multiple times with regard to each special command, and the additional communication loads may cost time and manpower (or labor power), causing the working efficiency of each of the Flash memory vendor and the memory controller vendor to be decreased. Therefore, a novel method is required for performing host-directed operations in order to provide a host device with direct control functionality over a Flash memory in a memory device during the Flash memory test of the Flash memory without need of altering the program code in the memory device.

SUMMARY OF THE INVENTION

It is therefore an objective of the claimed invention to provide a method for performing host-directed operations, and to provide an associated memory device and a controller thereof, in order to solve the above-mentioned problems.

It is another objective of the claimed invention to provide a method for performing host-directed operations, and to provide an associated memory device and a controller thereof, in order to provide a host device with direct control functionality over a Flash memory in the memory device during the Flash memory test of the Flash memory, having no need to alter the program code in the memory device.

It is another objective of the claimed invention to provide a method for performing host-directed operations, and to provide an associated memory device and a controller thereof, in order to provide one or more Flash memory vendors with a flexible test platform, having no need to alter the program code in the memory device.

According to a preferred embodiment of the claimed invention, a method for performing host-directed operations is provided. The method is applied to a controller of a Flash memory, wherein the Flash memory comprises a plurality of blocks. The method comprises: in a test mode of the controller, when receiving a host command from a host device, extracting at least one portion of associated information of the host command, wherein the at least one portion of the associated information is an encoded result that is generated by performing encoding on a host-directed operation command; and analyzing the at least one portion of the associated information according to at least one predetermined rule, in order to perform a host-directed operation corresponding to the host-directed operation command.

While the method mentioned above is disclosed, an associated memory device is further provided. The memory device comprises: a Flash memory, wherein the Flash memory comprises a plurality of blocks; and a controller arranged to access the Flash memory and manage the plurality of blocks. In addition, in a test mode of the controller, when receiving a host command from a host device, the controller extracts at least one portion of associated information of the host command, wherein the at least one portion of the associated information is an encoded result that is generated by performing encoding on a host-directed operation command. Additionally, the controller analyzes the at least one portion of the associated information according to at least one predetermined rule, in order to perform a host-directed operation corresponding to the host-directed operation command.

While the method mentioned above is disclosed, a controller of a memory device is further provided. The controller is utilized for accessing a Flash memory, wherein the Flash memory comprises a plurality of blocks. The controller comprises: a read only memory (ROM) arranged to store at least one portion of at least one program code; and a microprocessor arranged to execute the program code to control the access to the Flash memory and manage the plurality of blocks. In addition, in a test mode of the controller, when receiving a host command from a host device, the controller extracts at least one portion of associated information of the host command, wherein the at least one portion of the associated information is an encoded result that is generated by performing encoding on a host-directed operation command. Additionally, the controller analyzes the at least one portion of the associated information according to at least one predetermined rule, in order to perform a host-directed operation corresponding to the host-directed operation command.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
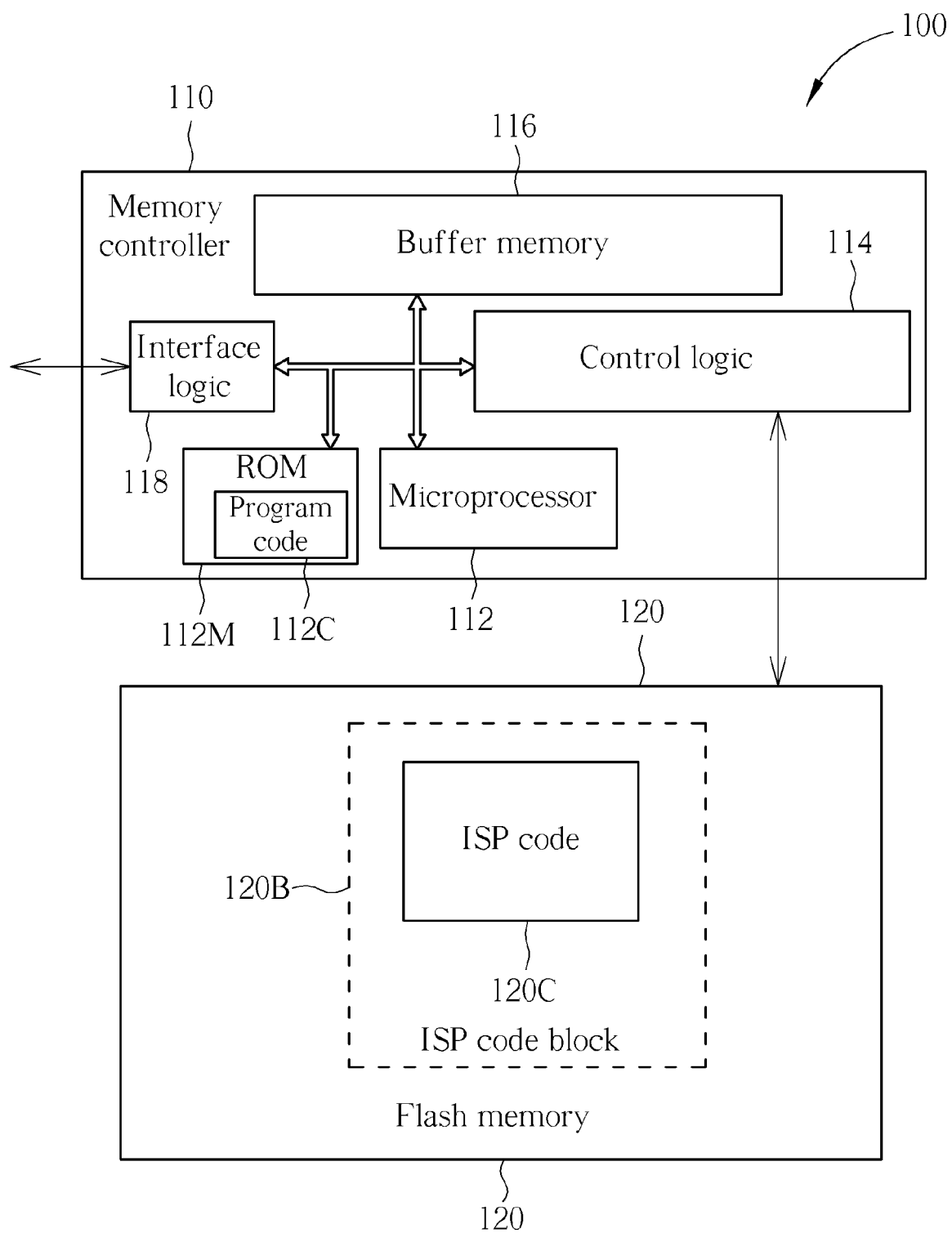
FIG. 1A is a diagram of a memory device according to a first embodiment of the present invention.

Please refer to FIG. 1A, which illustrates a diagram of a memory device 100 according to a first embodiment of the present invention. In particular, the memory device 100 of this embodiment can be a portable memory device, examples of which may include, but not limited to, memory cards complying with SD/MMC, CF, MS, or XD standards. Here, the portable memory device is taken as an example of the memory device 100 in this embodiment. This is for illustrative purposes only, and is not meant to be a limitation of the present invention. According to a variation of this embodiment, the memory device 100 can be a solid state drive (SSD). Referring to FIG. 1A, the memory device 100 comprises a Flash memory 120 comprising a plurality of blocks, and the plurality of blocks may comprise at least one in-system program (ISP) code block 120B. The memory device 100 further comprises a controller arranged to access the Flash memory 120, where the aforementioned controller of this embodiment is a memory controller 110. According to this embodiment, the memory controller 110 comprises a microprocessor 112, a read only memory (ROM) 112M, a control logic 114, at least one buffer memory 116, and an interface logic 118. In addition, the ROM 112M of this embodiment is arranged to store a program code 112C, and the microprocessor 112 is arranged to execute the program code 112C to control the access to the Flash memory 120. Please note that the program code 112C can be stored in the buffer memory 116 or any of various kinds of memories according to variations of this embodiment.

Figure 1B:
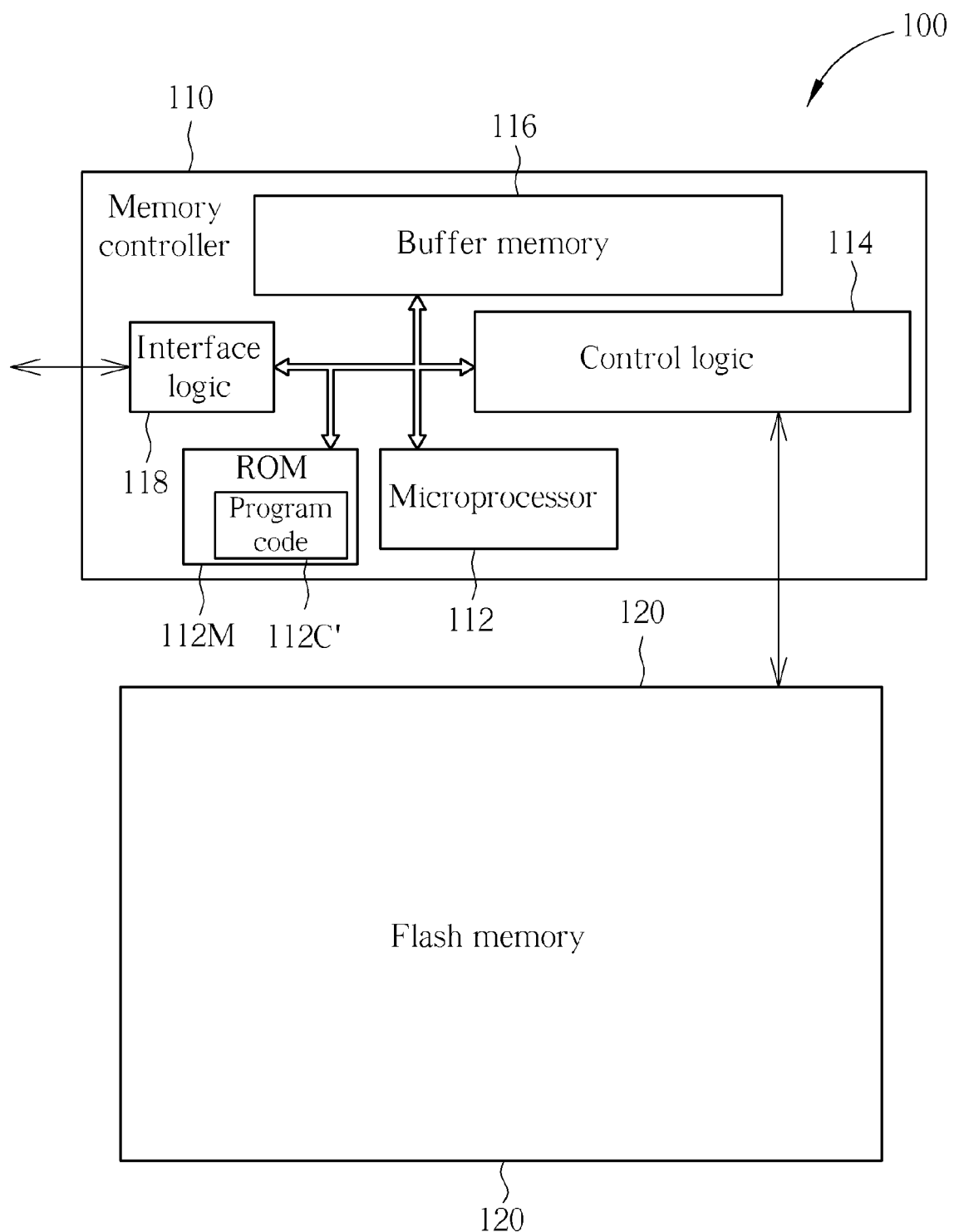
FIG. 1B is a diagram of a memory device according to a second embodiment of the present invention.

As shown in FIG. 1A, the aforementioned at least one ISP code block 120B is utilized for storing at least one ISP code 120C (e.g. one or more ISP codes, which can collectively be referred to as the ISP code 120C, for simplicity), and the microprocessor 112 can also execute the ISP code 120C to control the access to the Flash memory 120, where the ISP code 120C can be regarded as the extension of the program code 112C. By utilizing the architecture shown in FIG. 1A, the storage volume of the ROM 112M and associated costs can be saved in this embodiment. This is for illustrative purposes only, and is not meant to be a limitation of the present invention. According to different variations of this embodiment, such as the embodiment shown in FIG. 1B, in a situation where the storage volume of the ROM 112M and associated costs are not the main issue under consideration, the ISP code 120C can be integrated into the program code 112C shown in FIG. 1A to generate the program code 112C' shown in FIG. 1B.

In practice, the memory controller 110 that executes at least one program code (e.g. the program code 112C, the ISP code 120C, and/or the program code 112C') by utilizing the microprocessor 112 is capable of performing various control operations by utilizing the internal components within the memory controller 110. For example, the memory controller 110 utilizes the control logic 114 to control access to the Flash memory 120 (e.g. operations of accessing at least one block or at least one page), utilizes the buffer memory 116 to perform buffering operations for the memory controller 110, and utilizes the interface logic 118 to communicate with a host device.

Figure 2:
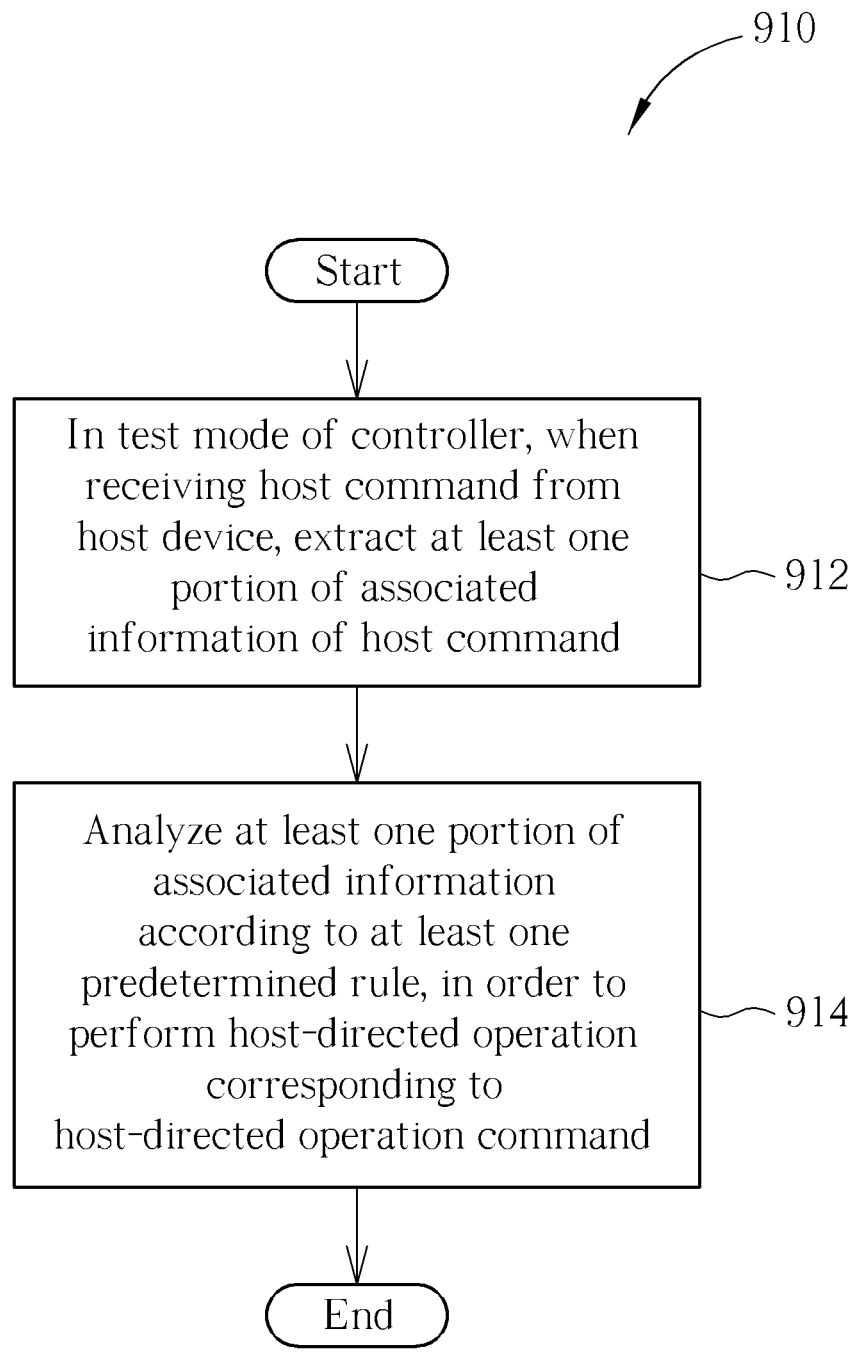
FIG. 2 is a flowchart of a method for performing host-directed operations according to an embodiment of the present invention.

According to this embodiment, in addition to accessing the Flash memory 120, the memory controller 110 is capable of properly managing the plurality of blocks mentioned above. The controller may operate in a normal mode, where the normal mode can be utilized for accessing data for the end user. In addition, the controller may operate in a test mode, where the test mode can be utilized for performing various combinations of host-directed operations, in order to achieve the goal of performing the Flash memory test mentioned above. Referring to FIG. 2, related details are further described as follows.

FIG. 2 is a flowchart of a method 910 for performing host-directed operations according to an embodiment of the present invention. The method can be applied to the memory device 100 in any of the embodiments respectively shown in FIG. 1A and FIG. 1B, and more particularly, the aforementioned controller (e.g. the memory controller 110 that executes the aforementioned at least one program code by utilizing the microprocessor 112). The method is described as follows.

In Step 912, in the test mode of the controller, when receiving a host command from the host device, the controller extracts at least one portion of associated information of the host command, where the aforementioned at least one portion of the associated information is an encoded result that is generated by performing encoding on a host-directed operation command. More particularly, the associated information may represent argument(s), parameter(s), and/or address(es) associated to the host command. For simplicity, the address (es) can be taken as an example of the associated information hereafter. This is for illustrative purposes only, and is not meant to be a limitation of the present invention. Other types of associated information (e.g. the argument(s), and/or the parameter(s)) can be utilized in different embodiments such as some variations of this embodiment.

In Step 914, the controller analyzes the aforementioned at least one portion of the associated information according to at least one predetermined rule, in order to perform a host-directed operation corresponding to the host-directed operation command. More particularly, the aforementioned at least one predetermined rule comprises at least one predetermined decoding rule corresponding to at least one predetermined encoding rule, and the associated information mentioned in Step 912 is generated by performing encoding according to the aforementioned at least one encoding rule. According to this embodiment, the controller can analyze the aforementioned at least one portion of the associated information according to a mapping table, in order to determine the host-directed operation command, where the mapping table represents the aforementioned at least one predetermined rule.

According to this embodiment, the host command can be regarded as a pseudo host command since, in a situation where the controller receives the host command from the host device in the test mode, the operation which the controller performs is typically different from that in the normal mode. That is, with regard to the same host command, the operation which the controller performs in the test mode is typically different from the operation which the controller performs in the normal mode. For example, the host command is a read command regarding a specific address, and when receiving the read command in the normal mode, the controller performs a read operation regarding the specific address. However, when receiving the read command in the test mode, the controller performs the host-directed operation. By utilizing pseudo host commands, the controller of this embodiment can easily be implemented without greatly increasing the chip area and the associated costs.

In addition, in a situation where the requests from the Flash memory vendor mentioned above change frequently, the aforementioned at least one program code (e.g. the program code 112C, the ISP code 120C, and/or the program code 112C') can be kept unvaried, rather than being altered again and again. Based upon the architecture disclosed above, the Flash memory vendor mentioned above can combine a plurality of host-directed operation commands according to various kinds of predetermined encoding rules, respectively, in order to generate various kinds of corresponding command sets for replacing the aforementioned one or more sets of special commands, where the controller can analyze according to a specific predetermined decoding rule corresponding to a specific predetermined encoding rule, in order to execute operations corresponding to a specific command set. Therefore, the present invention method and the associated memory device 100 and the controller thereof can provide the host device with direct control functionality over the Flash memory 120 during the Flash memory test of the Flash memory 120, having no need to alter the program code in the memory device 100.

Figure 3A:
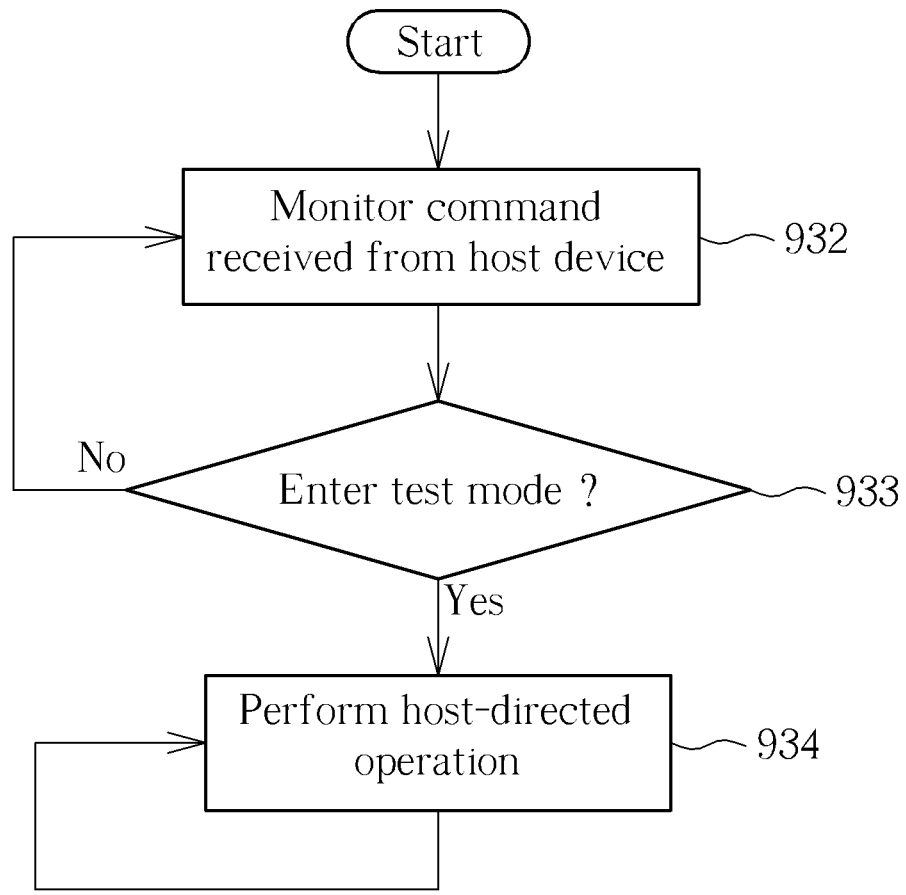
FIGS. 3A-3C respectively illustrate some implementation details of the method shown in FIG. 2 according to different embodiments of the present invention.

FIG. 3A illustrates some implementation details of the method 910 shown in FIG. 2 according to an embodiment of the present invention. This working flow is described as follows.

In Step 932, the controller monitors command(s) received from the host device. For example, the controller can monitor only one command each time, for further determination/decision(s). In another example, the controller can monitor multiple normal host commands received from the host device. In another example, after the controller performs determination/decision operations in other step(s) (e.g. Step 933), Step 932 is re-entered, and the controller can continue monitoring command(s).

In Step 933, the controller determines whether to enter the test mode. According to this embodiment, in the normal mode of the controller, the controller can detect a sequence formed with a plurality of normal host commands received from the host device, in order to determine whether to enter the test mode. More particularly, in the normal mode, the controller detects whether the sequence matches a predetermined sequence, in order to determine whether to enter the test mode. When the sequence matches the predetermined sequence, Step 934 is entered; otherwise, Step 932 is re-entered.

In Step 934, the controller performs host-directed operation(s). More particularly, the controller can perform the operations disclosed in Step 912 and Step 914 multiple times, such as bottom layer operations corresponding to a set of pseudo host commands. Afterward, Step 934 is re-entered, where the controller can perform bottom layer operations corresponding to another set of pseudo host commands.

In practice, the predetermined sequence mentioned above can be designed to be a sequence that can hardly occur, and even a sequence that will never occur, in order to keep the correctness of the working flow shown in FIG. 3A by preventing any erroneous determination/decision in Step 933. In addition, as disclosed above, the controller of this embodiment detects the sequence formed with the plurality of normal host commands received from the host device, in order to determine whether to enter the test mode. This is for illustrative purposes only, and is not meant to be a limitation of the present invention. According to some variations of this embodiment, in the normal mode, the controller detects whether a mode switching command is received form the host device, in order to determine whether to enter the test mode.

Figure 3B:
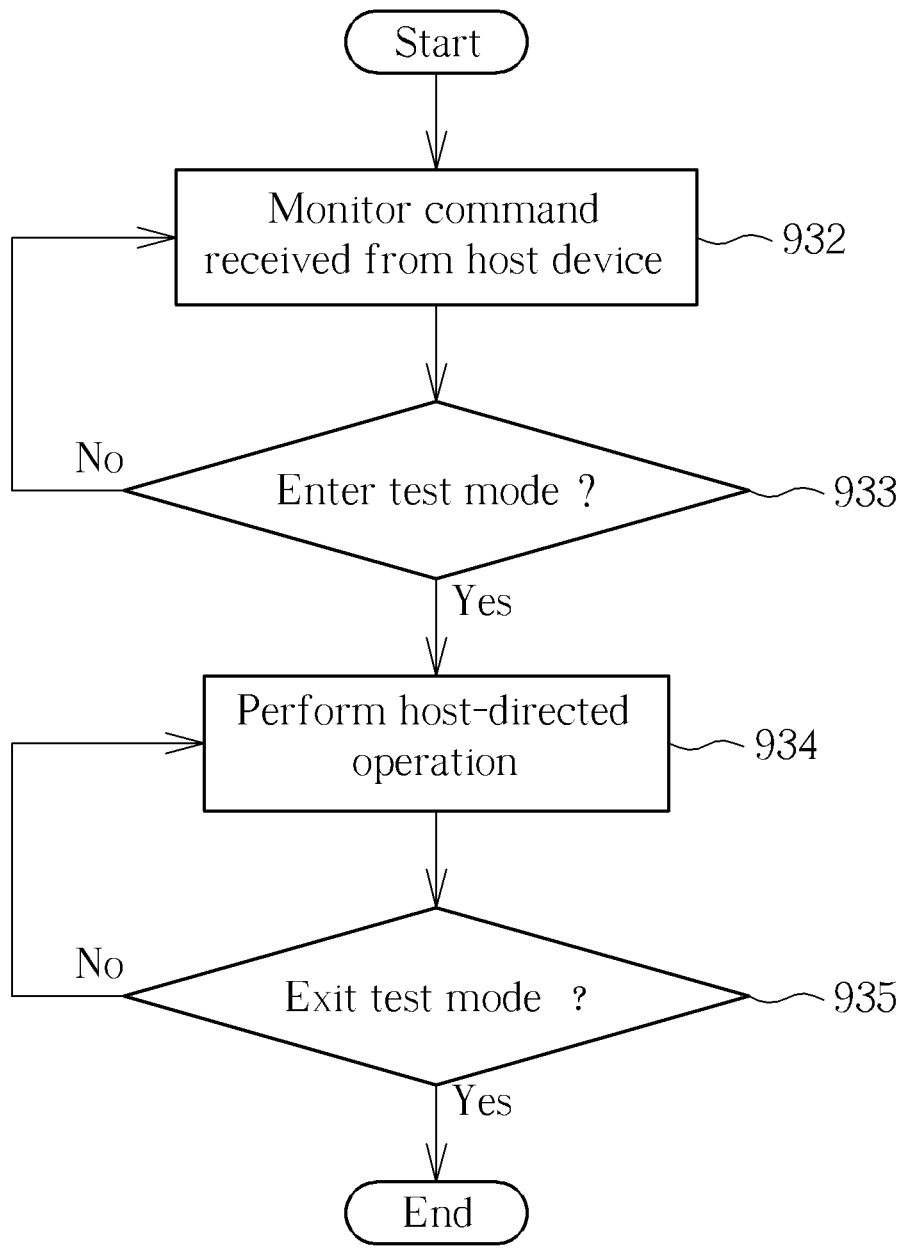

FIG. 3B illustrates some implementation details of the method 910 shown in FIG. 2 according to another embodiment of the present invention. This embodiment is a variation of the embodiment shown in FIG. 3A, where after Step 934 is executed, Step 935 is entered.

In Step 935, the controller determines whether to exit the test mode. According to this embodiment, in the test mode of the controller, by performing the analyzing operation disclosed in Step 914, the controller can determine whether the host-directed operation command under consideration indicates that the controller should exit the test mode. When it is detected that the host-directed operation command indicates that the controller should exit the test mode, the working flow shown in FIG. 3B comes to an end; otherwise, Step 934 is re-entered. Similar descriptions are not repeated in detail for this embodiment.

According to a variation of this embodiment, Step 935 can be integrated into Step 934 and become the last sub-step within multiple sub-steps of Step 934. Similar descriptions are not repeated in detail for this variation.

Figure 3C:
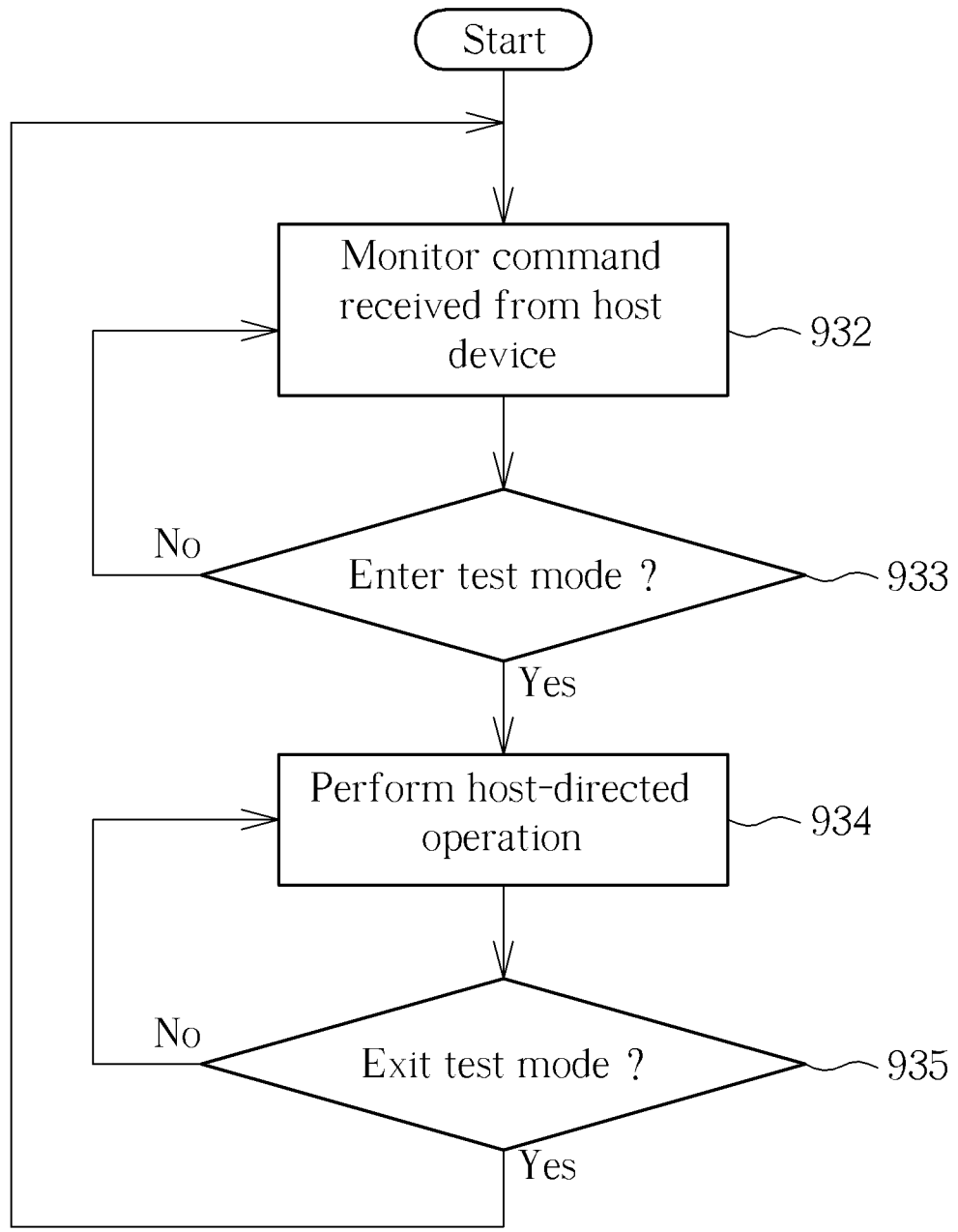

FIG. 3C illustrates some implementation details of the method 910 shown in FIG. 2 according to another embodiment of the present invention. This embodiment is a variation of the embodiment shown in FIG. 3B. More specifically, with regard to Step 935, when it is detected that the host-directed operation command indicates that the controller should exit the test mode, Step 932 is re-entered; otherwise, Step 934 is re-entered. Similar descriptions are not repeated in detail for this embodiment.

Figure 4:
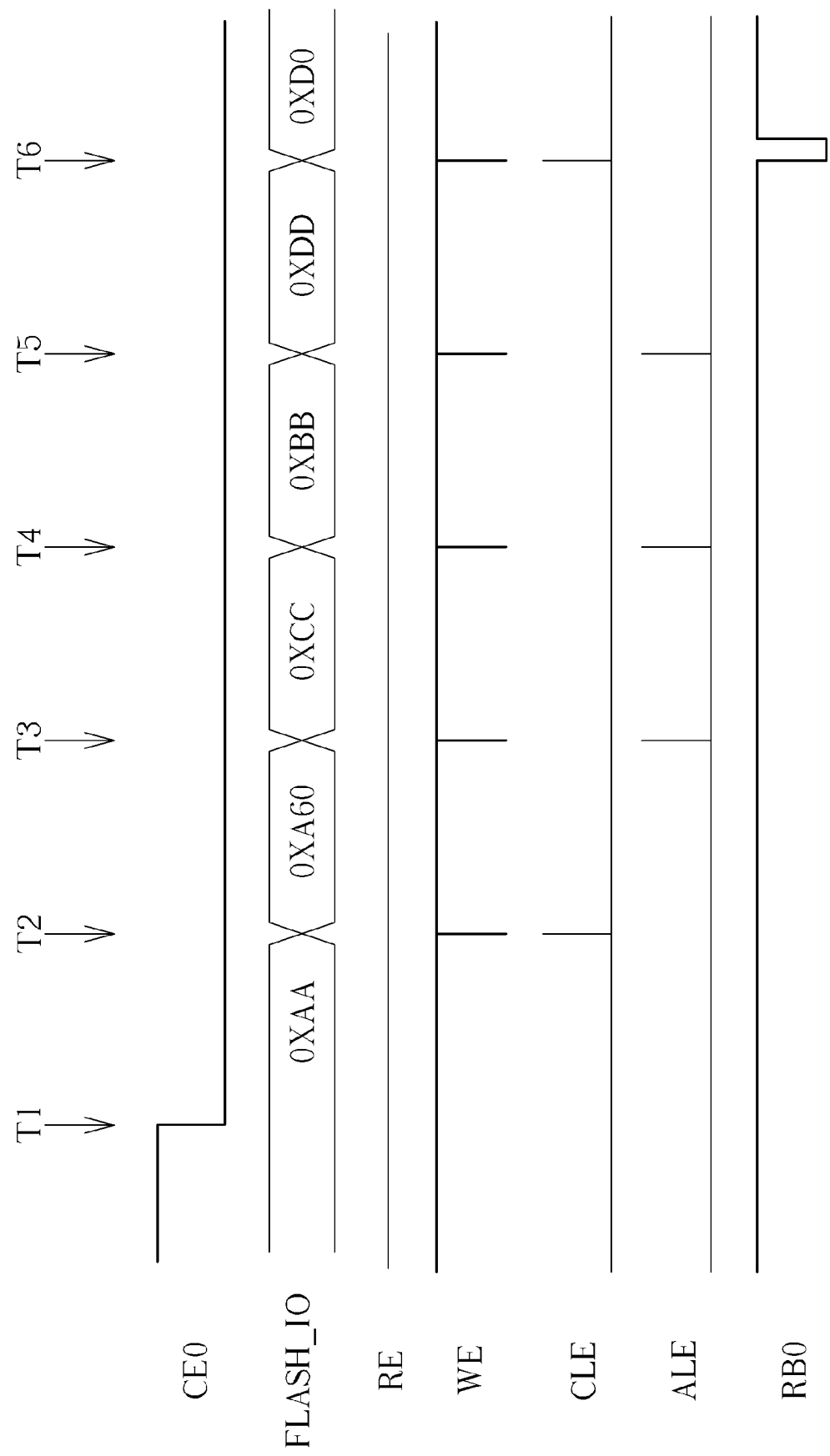
FIG. 4 illustrates some signals involved with the method shown in FIG. 2 according to an embodiment of the present invention.

FIG. 4 illustrates some signals involved with the method 910 shown in FIG. 2 according to an embodiment of the present invention, and more particularly, related signals of the Flash memory 120, such as the chip enable signal CE0, the Flash memory input/output signal FLASH_IO, the read enable signal RE, the write enable signal WE, the command line enable signal CLE, the address line enable signal ALE, and the read busy signal RB0.

For better comprehension, the time points T1, T2, T3, T4, T5, and T6 respectively corresponding to a plurality of host commands such as the read commands Read_Address (010000000000), Read_Address(026000000000), Read_Address(03CC00000000), Read_Address (03BB00000000), Read_Address(03DD00000000), and Read_Address(02D000000000) are illustrated in FIG. 4, where the associated information of these read commands are the addresses 010000000000, 026000000000, 03CC00000000, 03BB00000000, 03DD00000000, and 02D000000000, respectively. The aforementioned at least one portion of the associated information in Step 912 may represent the left four digits of any of the addresses 010000000000, 026000000000, 03CC00000000, 03BB00000000, 03DD00000000, and 02D000000000 (based upon the hex expression), such as any of the values 0100, 0260, 03CC, 03BB, 03DD, and 02D0. According to this embodiment, the aforementioned at least one predetermined rule in Step 914 (and more particularly, the mapping table) indicates that the left two digits of the four digits mentioned above (e.g. any of the values 01, 02, 03, 03, 03, and 02 respectively extracted from the left two digits of the values 0100, 0260, 03CC, 03BB, 03DD, and 02D0) represent some host-directed operation commands, where the values 01, 02, and 03 represent the chip enable command for controlling the chip enable signal CE0, the command line enable command for controlling the command line enable signal CLE, and the address line enable command for controlling the address line enable signal ALE, respectively. In addition, the aforementioned at least one predetermined rule in Step 914 (and more particularly, the mapping table) indicates that the right two digits of the four digits mentioned above (e.g. any of the values 00, 60, CC, BB, DD, and D0 respectively extracted from the right two digits of the values 0100, 0260, 03CC, 03BB, 03DD, and 02D0) represent auxiliary information of the host-directed operation commands, where the meaning of the auxiliary information can be defined or determined in accordance with the host-directed operation command under consideration when needed.

For example, when the host command mentioned in Step 912 is the read command Read_Address(010000000000), the controller controls the chip enable signal CE0 corresponding to the chip 0 (which is a Flash memory chip within the Flash memory 120) to be in the enable state thereof (e.g., a low level in this embodiment) in order to enable the chip 0, where the aforementioned right two digits such as the value 00 represents the chip 0. When the host command mentioned in Step 912 is the read command Read_Address(026000000000), the controller temporarily controls the command line enable signal CLE to be in the enable state thereof (e.g., a high level in this embodiment) and transmits an erase command, where the aforementioned right two digits such as the value 60 represents the erase command, which is illustrated as "0X60" in FIG. 4. When the host command mentioned in Step 912 is the read command Read_Address(03CC00000000), the controller temporarily controls the address line enable signal ALE to be in the enable state thereof (e.g., a high level in this embodiment) and transmits an address CC, where the aforementioned right two digits such as the value CC represents the address, which is illustrated as "0XCC" in FIG. 4. When the host command mentioned in Step 912 is the read command Read_Address(03BB00000000), the controller temporarily controls the address line enable signal ALE to be in the enable state thereof (e.g., the high level in this embodiment) and transmits an address BB, where the aforementioned right two digits such as the value BB represents the address, which is illustrated as "0XBB" in FIG. 4. When the host command mentioned in Step 912 is the read command Read_Address(03DD00000000), the controller temporarily controls the address line enable signal ALE to be in the enable state thereof (e.g., the high level in this embodiment) and transmits an address DD, where the aforementioned right two digits such as the value DD represents the address, which is illustrated as "0XDD" in FIG. 4. When the host command mentioned in Step 912 is the read command Read_Address (02D000000000), the controller temporarily controls the command line enable signal CLE to be in the enable state thereof (e.g., the high level in this embodiment) and transmits an end command to make the Flash memory 120 start performing the associated operations (more particularly, the associated host-directed operations), where the aforementioned right two digits such as the value D0 represents the end command, which is illustrated as "0XD0" in FIG. 4, for controlling the Flash memory 120 to start performing the associated operations (more particularly, the associated host-directed operations). As a result, when the Flash memory 120 starts performing the associated operations (during a time interval starting from the time point T6), the read busy signal RB0 corresponding to the chip 0 is temporarily in a busy state (e.g., a low level in this embodiment).

According to this embodiment, in a situation where the controller is in the test mode, when transmitting a set of pseudo host commands (e.g. the read commands Read_Address(010000000000), Read_Address(026000000000), Read_Address(03CC00000000), Read_Address (03BB00000000), Read_Address(03DD00000000), Read_Address(02D000000000), . . . , etc.) to the memory device 100, the host device can direct some corresponding bottom layer operations of the memory device 100. Please note that, in a situation where the controller is in the normal mode, the host device cannot arbitrarily control these bottom layer operations. In this embodiment, these bottom layer operations can be utilized for achieving the goal of directly erasing some blocks.

According to a variation of this embodiment, in a situation where the controller is in the test mode, when transmitting another set of pseudo host commands such as the read commands Read_Address(010000000000), Read_Address (028000000000), Read_Address(03AA00000000), Read_Address(03BB00000000), Read_Address (041100000000), Read_Address(042200000000), Read_Address(021000000000), . . . , etc. to the memory device 100, the host device can direct some corresponding bottom layer operations of the memory device 100. In this variation, these bottom layer operations can be utilized for achieving the goal of directly writing/programming data 11 and 22 into the blocks of the addresses AA and BB, respectively.

More specifically, when the host command mentioned in Step 912 is the read command Read_Address (010000000000), the controller controls the chip enable signal CE0 corresponding to the chip 0 to be in the enable state thereof in order to enable the chip 0, where the aforementioned right two digits such as the value 00 represents the chip 0. When the host command mentioned in Step 912 is the read command Read_Address(028000000000), the controller temporarily controls the command line enable signal CLE to be in the enable state thereof and transmits a write command, where the aforementioned right two digits such as the value 80 represents the write command. When the host command mentioned in Step 912 is the read command Read_Address (03AA00000000), the controller temporarily controls the address line enable signal ALE to be in the enable state thereof and transmits the address AA, where the aforementioned right two digits such as the value AA represents the address. When the host command mentioned in Step 912 is the read command Read_Address(03BB00000000), the controller temporarily controls the address line enable signal ALE to be in the enable state thereof and transmits the address BB, where the aforementioned right two digits such as the value BB represents the address. When the host command mentioned in Step 912 is the read command Read_Address (041100000000), the controller and transmits the data 11, where the aforementioned left two digits such as the value 04 represents "Write Data Only", and the aforementioned right two digits such as the value 11 represents the data. When the host command mentioned in Step 912 is the read command Read_Address(042200000000), the controller transmits the data 22, where the aforementioned right two digits such as the value 22 represents the data. When the host command mentioned in Step 912 is the read command Read_Address (02D000000000), the controller temporarily controls the command line enable signal CLE to be in the enable state thereof and transmits the end command to make the Flash memory 120 start performing the associated operations (more particularly, the associated host-directed operations), where the aforementioned right two digits such as the value D0 represents the end command, which is utilized for controlling the Flash memory 120 to start performing the associated operations (more particularly, the associated host-directed operations).

It is an advantage of the present invention that the present invention method and the associated memory device and the controller thereof can provide the host device with direct control functionality over the Flash memory in the memory device during the Flash memory test of the Flash memory, having no need to alter the program code in the memory device. In contrast to the related art, the present invention method and the associated memory device and the controller thereof can greatly increase the working efficiency of each of the Flash memory vendor and the memory controller vendor.

Those skilled in the art will readily observe that numerous modifications and alterations of the device and method may be made while retaining the teachings of the invention.

What is claimed is:

1. A method for performing host-directed operations, the method being applied to a controller of a Flash memory, the Flash memory comprising a plurality of blocks, the method comprising:
   in a test mode of the controller, when receiving a host command from a host device, obtaining at least one portion of associated information of the host command, wherein the at least one portion of the associated information is an encoded result corresponding to a specific host-directed operation command of a plurality of host-directed operation commands, wherein the specific host-directed operation command is different from the host command; and
   determining the corresponding specific host-directed operation command of the at least one portion of the associated information according to at least one predetermined relationship between the portion of the associated information and the corresponding specific host-directed operation command, in order to perform a host-directed operation corresponding to the specific host-directed operation command.

2. The method of claim 1, further comprising:
   in a normal mode of the controller, detecting a sequence formed with a plurality of normal host commands received from the host device, in order to determine whether to enter the test mode.

3. The method of claim 2, wherein the step of detecting the sequence formed with the plurality of normal host commands received from the host device in order to determine whether to enter the test mode further comprises:
   in the normal mode, detecting whether the sequence matches a predetermined sequence, in order to determine whether to enter the test mode.

4. The method of claim 1, further comprising:
   in a normal mode of the controller, detecting whether a mode switching command is received form the host device, in order to determine whether to enter the test mode.

5. The method of claim 1, wherein the step of analyzing determining the corresponding specific host-directed operation command of the at least one portion of the associated information according to the at least one predetermined relationship between the portion of the associated information and the corresponding specific host-directed operation command in order to perform the host-directed operation corresponding to the host-directed operation command further comprises:
   analyzing the at least one portion of the associated information according to a mapping table, in order to determine the specific host-directed operation command, wherein the mapping table represents the at least one predetermined relationship.

6. The method of claim 1, wherein the associated information represents argument(s), parameter(s), and/or address(es) associated to the host command.

7. A memory device, comprising:
   a Flash memory, wherein the Flash memory comprises a plurality of blocks; and
   a controller arranged to access the Flash memory and manage the plurality of blocks, wherein in a test mode of the controller, when receiving a host command from a host device, the controller obtains at least one portion of associated information of the host command, wherein the at least one portion of the associated information is an encoded result corresponding to a specific host-directed operation command of a plurality of host-directed operation commands, wherein the specific host-directed operation command is different from the host command;
   wherein the controller determines the corresponding specific host-directed operation command of the at least one portion of the associated information according to at least one predetermined relationship between the portion of the associated information and the corresponding specific host-directed operation command, in order to perform a host-directed operation corresponding to the specific host-directed operation command.

8. The memory device of claim 7, wherein in a normal mode of the controller, the controller detects a sequence formed with a plurality of normal host commands received from the host device, in order to determine whether to enter the test mode.

9. The memory device of claim 8, wherein in the normal mode, the controller detects whether the sequence matches a predetermined sequence, in order to determine whether to enter the test mode.

10. The memory device of claim 7, wherein in a normal mode of the controller, the controller detects whether a mode switching command is received form the host device, in order to determine whether to enter the test mode.

11. The memory device of claim 7, wherein the controller determines the corresponding specific host-directed operation command of the at least one portion of the associated information according to a mapping table, in order to determine the specific host-directed operation command; and the mapping table represents the at least one predetermined relationship.

12. The memory device of claim 7, wherein the associated information represents argument(s), parameter(s), and/or address(es) associated to the host command.

13. A controller of a memory device, the controller being utilized for accessing a Flash memory, the Flash memory comprising a plurality of blocks, the controller comprising:
a read only memory (ROM) arranged to store at least one portion of at least one program code; and
a microprocessor arranged to execute the program code to control the access to the Flash memory and manage the plurality of blocks, wherein in a test mode of the controller, when receiving a host command from a host device, the controller obtains at least one portion of associated information of the host command, wherein the at least one portion of the associated information is an encoded result corresponding to a specific host-directed operation command of a plurality of host-directed operation commands, wherein the specific host-directed operation command is different from the host command;
wherein the controller determines the corresponding specific host-directed operation command of the at least one portion of the associated information according to at least one predetermined relationship between the portion of the associated information and the corresponding specific host-directed operation command, in order to perform a host-directed operation corresponding to the specific host-directed operation command.

14. The controller of claim 13, wherein in a normal mode of the controller, the controller detects a sequence formed with a plurality of normal host commands received from the host device, in order to determine whether to enter the test mode.

15. The controller of claim 14, wherein in the normal mode, the controller detects whether the sequence matches a predetermined sequence, in order to determine whether to enter the test mode.

16. The controller of claim 13, wherein in a normal mode of the controller, the controller detects whether a mode switching command is received form the host device, in order to determine whether to enter the test mode.

17. The controller of claim 13, wherein the controller determines the corresponding specific host-directed operation command of the at least one portion of the associated information according to a mapping table, in order to determine the specific host-directed operation command; and the mapping table represents the at least one predetermined relationship.

18. The controller of claim 13, wherein the associated information represents argument(s), parameter(s), and/or address(es) associated to the host command.

* * * * *